(12) United States Patent
Yeh et al.

(10) Patent No.: US 7,845,669 B2
(45) Date of Patent: Dec. 7, 2010

(54) SAFETY RESTRAINT FOR VEHICLE TOWING ASSEMBLIES

(75) Inventors: Edward Yeh, Diamond Bar, CA (US); Michael R. Wallden, Pasadena, CA (US); Joel N. Payne, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 222 days.

(21) Appl. No.: 12/026,242

(22) Filed: Feb. 5, 2008

(65) Prior Publication Data
US 2009/0194970 A1 Aug. 6, 2009

(51) Int. Cl.
*B60D 1/28* (2006.01)
*B60D 1/18* (2006.01)

(52) U.S. Cl. ...................... 280/457; 280/480

(58) Field of Classification Search .......... 280/483, 280/486, 484, 457, 507, 432, 480, 408; 213/1 R, 213/1.3; 104/53, 63; 180/380
See application file for complete search history.

(56) References Cited

U.S. PATENT DOCUMENTS

| 122,388 | A | * | 1/1872 | Kennedy et al. | 285/148.15 |
|---|---|---|---|---|---|
| 149,441 | A | * | 4/1874 | Caswell | 285/148.15 |
| 2,067,287 | A | * | 1/1937 | Pearce | 180/380 |
| 2,189,667 | A | * | 2/1940 | Kries | 280/493 |
| 2,374,249 | A | * | 4/1945 | Wadsworth, Jr | 141/382 |
| 2,434,358 | A | * | 1/1948 | Louis | 439/788 |
| 2,650,400 | A | * | 9/1953 | Kellems | 403/345 |
| 2,746,771 | A | * | 5/1956 | Gross | 280/494 |
| 2,833,567 | A | * | 5/1958 | Bacher et al. | 285/95 |
| 3,133,725 | A | * | 5/1964 | Lanum | 254/134.3 R |
| 3,271,049 | A | * | 9/1966 | Schoonmaker et al. | 280/493 |
| 3,346,284 | A | * | 10/1967 | Petersen et al. | 403/78 |
| 3,550,710 | A | * | 12/1970 | Spanski | 180/14.3 |
| 4,321,854 | A | * | 3/1982 | Foote et al. | 87/6 |
| 4,601,507 | A | * | 7/1986 | Fallon | 294/86.42 |
| 5,038,663 | A | * | 8/1991 | Plummer | 87/6 |
| 6,050,587 | A | * | 4/2000 | Panhausen | 280/480 |
| 6,092,826 | A | | 7/2000 | Pingel et al. | |
| 6,179,317 | B1 | | 1/2001 | Hurst et al. | |
| 6,467,790 | B1 | | 10/2002 | Hurley | |
| 6,991,247 | B1 | | 1/2006 | Hahne et al. | |
| 7,125,031 | B1 | | 10/2006 | Schoonover | |
| 7,237,790 | B2 | | 7/2007 | Gehriing et al. | |
| 7,290,755 | B1 | | 11/2007 | Thibodeaux | |

(Continued)

*Primary Examiner*—Lesley Morris
*Assistant Examiner*—Wesley Potter
(74) *Attorney, Agent, or Firm*—Marsh Fischmann & Breyfogle LLP; Kent A. Lembke

(57) ABSTRACT

A safety restraint for use with a towing assembly. The towing assembly is attached at a first end to a towing vehicle and at a second end to a towed vehicle. The restraint includes an elongate, hollow body that receives the towing assembly. The body is formed from at least two fibers that are woven into a multi-axis braid pattern. The cylindrical body at least partially encapsulates the towing assembly. For example, the body may include a first set of fibers arranged into a first ribbon of a particular width and a second set of fibers arranged into a second ribbon of a particular width, and the two ribbons are woven into a biaxial braid to provide the hollow body. The restraint also includes coupling mechanisms that retain the ends of the body and attach these ends to the towing vehicle and to the towed vehicle.

22 Claims, 5 Drawing Sheets

U.S. PATENT DOCUMENTS

| | | |
|---|---|---|
| 7,290,783 B2 | 11/2007 | Dornbos |
| 7,293,791 B1 | 11/2007 | Williams, Jr. |
| 2002/0047246 A1* | 4/2002 | Harkcom et al. ............ 280/494 |
| 2006/0103110 A1* | 5/2006 | Nuesch ....................... 280/457 |

* cited by examiner

SAFETY RESTRAINT FOR VEHICLE TOWING ASSEMBLIES

BACKGROUND OF THE INVENTION

1. Field of the Invention

The present invention relates, in general, to safety related to towing vehicles such as towing and towed vehicles and the hitch, tow bar, or other connection as found in roller coasters and other rides in amusement parks and with use of trailers and other vehicles towed commercially and recreationally, and, more particularly, to devices for restraining mechanical components used to connect a drive or towing vehicle to a trailing or towed vehicle in the case of a failure of one or more of the components and, in some cases, for maintaining the towing connection or assembly between the two vehicles upon component failure (e.g., to retain the tensile connection between the vehicles to allow safe stopping of the vehicles for maintenance).

2. Relevant Background

Amusement and theme parks are popular entertainment destinations for people worldwide. Many people visit these parks for the excitement associated with roller coasters and other thrill rides. To continue to attract these visitors or guests, all rides including the thrill rides have to be designed, maintained, and operated at extremely high levels of safety. Even one accident per thousands upon thousands of rides is considered too many by park management as well as the general public, and accidents on these rides attract public attention.

Statistically, roller coasters and other amusement park rides are very safe with guests generally having a higher risk of injury driving to the park than on the park's roller coasters. To this end, roller coasters and other thrill rides are designed with many safety systems such as mechanical fail-safe devices such as redundant structural components to protect against the failure of a single component. For example, roller coasters and other rides involve vehicles that are connected in trains or in two or more sets of vehicles or cars such that there is a towing vehicle and a towed, trailing vehicle. The towing assembly for a typical roller coaster may include a rigid tow bar extending between the two vehicles and connected at each end with a coupling assembly (or hitch assembly). To reduce risks associated with failure of the tow bar or coupling assemblies, a safety cable is typically provided that is attached to each vehicle and is designed to take the load in the tensile direction in the event of a failure. During operation, if the primary towing assembly fails the safety cable stretches and keeps the towed vehicle with the towing vehicle. Unfortunately, the cable is only useful in tension and when the towing or lead vehicle brakes to a stop the towed vehicle often will collide into the back of the towing vehicle. In some cases, a redundant load path is provided in the form of a secondary tow bar and the two tow bars may share the load. However, this increases the complexity of the ride design and increases manufacturing and maintenance costs associated with the roller coaster or other park ride.

Another safety concern associated with towing assemblies and existing safety devices is that failure of components may result in broken parts separating from the assembly. A broken bolt, pin, tow bar component, or other part may become a projectile as it is released from the fast moving vehicle. The towing and towed vehicles may also be on a track high above the ground when the failure occurs and the broken part or pieces may fall on park guests. Either of these failure scenarios may result in injury of park visitors that are not even on the ride. The failure to restrain the broken parts may also result in a tow bar or other part becoming disconnected at one end and dropping downward toward the track or rail. If the back end (or end near the towed vehicle) falls downward, the tow bar may simply be dragged, but if the front end (or end near the towing vehicle) falls downward, the tow bar may catch on the ground, the track or rail, or other structure. Since the vehicle may still be moving at high speed, the dropped or dangling tow bar may lift the towed vehicle off the ground causing a crash (e.g., similar to a track and field participant in the pole vault event).

Towing safety is a concern in many other areas besides with towed vehicles at amusement parks. In the United States, more and more people are using their primary vehicle, such as a sports utility vehicle, a pickup truck, or other automobile, to tow other vehicles such as trailers carrying recreational equipment or camping trailers. The recreational vehicle (RV) industry is rapidly expanding, too, with many drivers attaching trailers or other vehicles behind their RVs with a towing assembly. In commercial settings, the roads are filled with semis and other trucks pulling trailers that are attached with tow bars, hitches, and other towing assemblies. Failure of the components of these towing assemblies may result in projectiles being sent bouncing down the highway because, if a safety device is used, it typically will only be a chain or wire cable used to try to retain the trailer with the towing vehicle (e.g., to function under tensile load to pull the towed vehicle until the driver can pull off the road). The use of a safety chain, though, may result in the towing assembly or tow bar falling down, and the front of the tow bar may dig into or catch on a physical structure causing the trailer to vault off the ground or to over turn causing a serious accident. Also, the safety chain is ineffective under compressive loading and will provide no protection from the trailing or towed vehicle colliding with the lead or towing vehicle when that vehicle comes to a stop (e.g., the trailing vehicle has no brakes and its momentum will cause it to continue to roll into the braking lead vehicle).

Hence, there remains a need for an improved safety device for use with towing assemblies such as tow bars, hitches, and the like. Preferably, such a safety device would be easy to install, relatively inexpensive to manufacture and maintain, and protect against broken components breaking away and becoming dangerous projectiles.

SUMMARY OF THE INVENTION

The present invention addresses the above problems by providing towing assembly restraints useful with nearly any towing assembly or vehicle-to-vehicle connections such as, but not limited to, tow bars used for roller coasters and other amusement park rides, for semi-truck and other truck/automobiles pulling trailers, parking trams, and the like and hitch mechanisms such as ball-type hitches for commercial and recreational vehicles with trailers and other towed vehicles. The restraints of the present invention include a woven or braided body of fibers, wires, or threads of a metallic or composite material and/or a synthetic and/or organic material that is configured to have a first diameter when at rest or under compression that is larger than a second diameter when installed over a towing assembly and placed under tension (e.g., elongated or stretched along the towing assembly such as over a tow bar).

The restraints are generally configured with a pattern similar to Chinese finger traps or common biaxial braids, and when installed over a towing assembly, the restraint (or towable restraint puzzle) encapsulates all or a desired portion of the towing assembly. In the event of failure of the towing assembly or its components, the woven, high tensile strength webbing or fabric of the restraint body is pulled by applied tensile forces as the towed vehicle tries to escape, and the body's fabric or webbing has a tensile strength greater than applied tensile forces (e.g., acts as a redundant tensile load path between the two vehicles). At this point, the restraint is "sprung" as it reaches its minimum diameter and its inner walls press inward on the encapsulated towing assembly to restrain or capture failed components, whereby broken or failed parts are not allowed to dissociate or become dangerous projectiles. The body captures broken parts and compresses them together such that in the event of braking of the lead or towing vehicle the towing assembly including the broken/failed components are restrained in place and aligned to continue to provide a compressive load bearing path or member. In this manner, the towing assembly restraint of the invention enables the towing and towed vehicle to continue to travel safely even in the event of a component failure whereas prior safety devices generally only provided a tensile load redundancy, provided no resistance to compressive forces, and did not capture broken components that could be dangerously released or drop down generating a vaulting force on the towed vehicle.

More particularly, a safety restraint (or towing assembly restraint) is provided for use with a towing assembly. The towing assembly is attached at a first end to a towing or lead vehicle and at a second end to a towed or trail vehicle. The restraint includes an elongate, hollow body that receives the towing assembly. The body is formed from at least two fibers or strands (e.g., metallic fiber, wire rope, composite material fibers, or the like) that are woven or combined into a multi-axis braid pattern that extends from a first end to a second end of the body. The braid pattern or walls of the tubular or hollow cylindrical body typically will at least partially encapsulate or cover the towing assembly. In one embodiment, the body includes a first set of fibers arranged into a first ribbon of a particular width and a second set of fibers arranged into a second ribbon of a particular width, and the two ribbons are woven into a biaxial braid to provide the hollow body. The restraint also includes coupling mechanisms (which may be retaining plates, clamps, or the like) that retain the ends of the body and attach these ends to the towing vehicle and to the towed vehicle.

Typically, the hollow body has a first length and a first diameter prior to its installation between the two vehicles (over the towing assembly) and upon installation the body has a second length greater than the first length and a second diameter that is less than the first diameter (e.g., the body constricts over the towing assembly to capture its parts). If the received towing assembly fails, the body becomes somewhat more elongated and its diameter shrinks further to tightly bind and trap the towing assembly. In addition to capturing the towing assembly components, the fibers are selected to have high tensile strength, and the body has a relatively high tensile yield strength but the tensile strength may vary widely to practice the invention with the tensile strength being selected to suit a particular application or range of applications, e.g., for use with a roller coaster, for use with a semi-trailer, for use with towing a rented moving trailer, and for numerous other applications. For example, but not as a limitation, the body may have a tensile strength of at least about 1000 pounds such as up to the range of 20,000 to 30,000 or more pounds. In some cases (such as amusement park rides), the towing assembly includes a tow bar that is coupled at its ends to have pitch and yaw movement, and the braid pattern and its fibers are configured to have a degree or amount of flexibility that allows the body to move to traverse corners or to allow changes in inclination. Further, the tow bar may be mounted for roll, and the coupling mechanism for the hollow body of the restraint may be adapted to allow the body of the restraint to rotate about its longitudinal axis with roll movement of the tow bar. In other words, the body allows for pitch and/or yaw such as to allow rotation about a connecting pin, ball, or the like at one or both ends of a tow bar. The material selection of the tow bar and the safety shroud (or safety restraint hollow body) could be designed to create a high friction force between the rigid tow bar member and the surrounding safety shroud or material of the hollow body wall.

According to another aspect, an apparatus is provided for use as a safety restraint for towing assemblies, rotating shafts, and other structures. The apparatus includes a cylindrical, hollow body with a wall formed from a plurality of fibers woven into a crosshatch pattern (e.g., fibers provided in two or more ribbons that are arranged in a multi-axial braid extending along the length of the wall). The hollow body has a first diameter and a first length when at rest (or under no tensile or compressive load) and a second diameter that is less than the first diameter and a second length that is greater than the first length under a tensile load (e.g., a load applied to install the body over a towing assembly, shaft, or other structure and/or after failure of such received structure that causes a tensile force to be applied upon the body). The apparatus further includes connecting members at the ends of the walls for connecting the apparatus to a support structure after a structure such as a towing assembly or rotatable shaft is received within the body. The support structure may include coupling mechanisms on a first and second vehicle (e.g., when the received structure is a towing assembly), and the tensile load may be a force of up to a 1000 pounds or more that stretches the body along its longitudinal axis. The second diameter may then constrict to less than about 50 percent of the first diameter. The connecting members may be configured to allow the body of the apparatus to rotate or roll about a longitudinal axis such as in response to the captured structure rolling or the like. The first diameter typically is greater than the outer dimensions (or diameter) of the received structure while the second diameter is about the same as these outer dimensions or diameter(s) (e.g., the body constricts to capture or apply an inward or retaining force upon the components of the received structure with greater pressure or force being applied by the inner surface of the wall as the tensile force is increased to stretch the body).

DETAILED DESCRIPTION OF THE PREFERRED EMBODIMENTS

Figure 1:
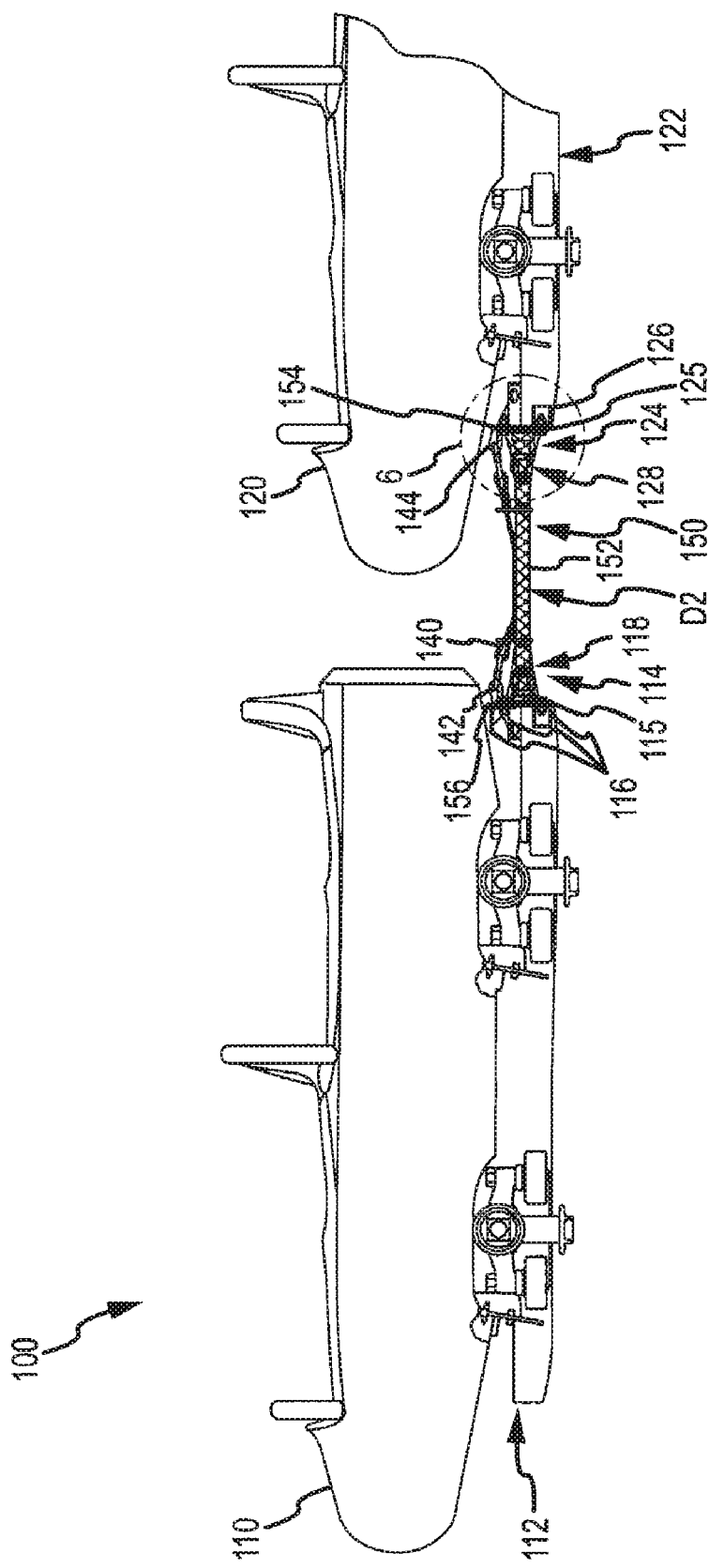
FIG. 1 is a partial side view of an amusement park ride such as a roller coaster illustrating use of a towing assembly restraint of one embodiment of the invention.

Briefly, embodiments of the present invention are directed to towing assembly restraints or assemblies that are useful for restraining or capturing components of a towing assembly. The restraints are conFIG.d to encase all or portions of a towing assembly between two vehicles (e.g., between a lead/towing vehicle and a trail/towed vehicle) such that upon a failure of one or more of the components of the towing assembly the towing assembly components are captured or restrained to avoid projectiles or loose parts and to prevent a portion dropping or dangling downward. The towing assembly restraints are also adapted such that they provide a redundant load path or tensile load bearing member such that if the towing assembly fails such that it cannot support the tensile load the restraint can withstand the tensile forces applied by the towed vehicle (at least for short periods to allow maintenance to be performed). Further, the restraint captures the towing assembly components and keeps them substantially in a linear arrangement such that these components can provide a compressive load path or compressive load bearing member to function at braking to reduce risks of the towed vehicle colliding with the back of the towing vehicle as was the case with safety chains or cables.

The towing assembly restraints are generally formed of a metallic material or composite material that is provided as fibers, strands, wires, or the like that are woven or braided together in a pattern similar to novelty devices typically called "Chinese finger traps." The woven body of the restraint may be thought of as having a bi-axial braid, and the restraint has its ends attached to the towing and towed vehicles with the cylindrical body over the portions of the towing assembly that are to be captured or restrained. As with a Chinese finger trap, the woven body is generally woven in a pattern that may be thought of as a bi-axial braid that provides a cylindrically shaped, elongate body that has a larger diameter at rest and a smaller diameter when the restraint is stretched along its longitudinal axis during installation. This shrinking of the diameter can be thought of as springing the trap and restraining components within the hollow body. If the restraint is placed under additional tension such as upon failure of the towing assembly, the braid or woven pattern causes the body to shrink even further in diameter trapping the towing assembly components. The braid (and/or the fabric/wire that is used to make the braid) is chosen to provide a tensile strength that exceeds the tensile force applied between the two vehicles, with a desired factor of safety (e.g., 1 to 3 times or more anticipated tensile forces). In roller coaster and/or ride applications, it may be desirable for the towing assembly restraint to provide movement in three axes of motion such as pitch, yaw, and roll, and the pitch and yaw may be provided with the flexibility of the woven body and the braid material (even when installed in tension) while the roll may be provided by a mounting or coupling mechanism that allows the woven body (or at least its ends) to rotate about its longitudinal axis. These and other features of towing assembly restraints will become clear from the following discussion of representative embodiments of the invention.

FIG. 1 illustrates an embodiment of an amusement park ride 100 such as a roller coaster or other ride in which two or more vehicles or cars are provided for guests. The ride 100 includes a lead or towing vehicle 110 and a trail or towed vehicle 120, with vehicles 110, 120 having frames or undercarriage assemblies 112, 122 for mating with a rail or track (not shown). The lead vehicle 110 is connected to and "tows" the trail vehicle 120 with a towing assembly. In this example, the towing assembly includes a tow bar 130 (shown in FIG. 2) extending between the two vehicles 110, 120. The tow bar 130 is attached at each end to the vehicles 110, 120 with connection assemblies 114, 124, and the connection assemblies 114, 124 are attached to the vehicle undercarriages 112, 122 via a mounting plate or bracket 115, 125 with fasteners 116, 126.

Further, to allow desired movement of the towed vehicle 120 relative to the towing vehicle 110, the connection assemblies 114, 124 each include coupling mechanisms 114, 124 that couple the tow bar 130 to the vehicles 110, 120 to allow pitch, roll, and yaw movements. As discussed below, the towing assembly restraint 150 is configured to allow these movements of the tow bar 130 and towed car 120 while still retaining or capturing the components of the towing assembly. In this case, a safety cable 140 is also provided, as is typical for most towed rides in parks, which is attached at each end with mounts 142, 144 to the plates 115, 125 (or another connection point on the undercarriage 112, 122). The cable 140 provides a redundant load path in tension, but, in some embodiments, the cable 140 is not included in the ride 100 because its functionality is replaced with the towing assembly restraint 150, which provides a secondary or redundant load member in tension (or can resist a tensile load).

As discussed above, it is desired to limit the risk of components of the towing assembly such as parts of the coupling assemblies (e.g., U-joints or the like) 118, 128 to fail and be allowed to become dangerous projectiles. It is also desired to prevent the tow bar 130 to break and drop down where it can become bound in the track or other ride structure causing one or both of the vehicles 110, 120 to become derailed or otherwise crash. To address these needs, the ride 100 includes a towing assembly restraint 150. The restraint 150 is generally an elongate cylinder with a body 152 formed of walls of woven or braided material such as a steel alloy, wire rope, or a composite material (such as fiberglass, Kevlar, carbon fiber, or the like) with high tensile strength. The material of the body 152 is preferably braided in a pattern such that it acts like a Chinese finger trap to allow a certain amount of elongation from a first, larger diameter to a second, smaller diameter at which the braided material of the body 152 resists further elongation and traps or compresses components of the tow bar 130 and connection assemblies 114, 124. In this embodiment, the restraint 150 is mounted at each end 154, 156 over the entire coupling assemblies 118, 128 and attached to the mounting plates 115, 125 to allow it to roll (e.g., to allow rotation about its longitudinal axis which is generally parallel to the longitudinal axis of the tow bar 130 (or towing assembly)). The finger trap-like restraint 150 has a flexible body 152 that allows the tow bar 130 to move about the two axes of the coupling assemblies 118, 128 or to provide pitch and yaw (e.g., to allow the towed vehicle 120 to move relative to the towing vehicle 110). The material selection of the tow bar and the safety shroud may, in some embodiments, be performed so as to create a high friction force between the rigid tow bar member and the surrounding safety shroud or restraint 150. In this manner, there is interlocking force between the rigid tow bar member and the surrounding safety shroud 150. In other embodiments, a covering (not shown) is provided on the tow bar 130 to achieve such a friction-based gripping reaction between members 130, 150. For example, the tow bar 130 may be covered in a shrink fit rubber coating or the like such that there is a gripping force between these components when the safety shroud or restraint 150 comes into contact with the tow bar or other rigid member 130.

Figure 2:
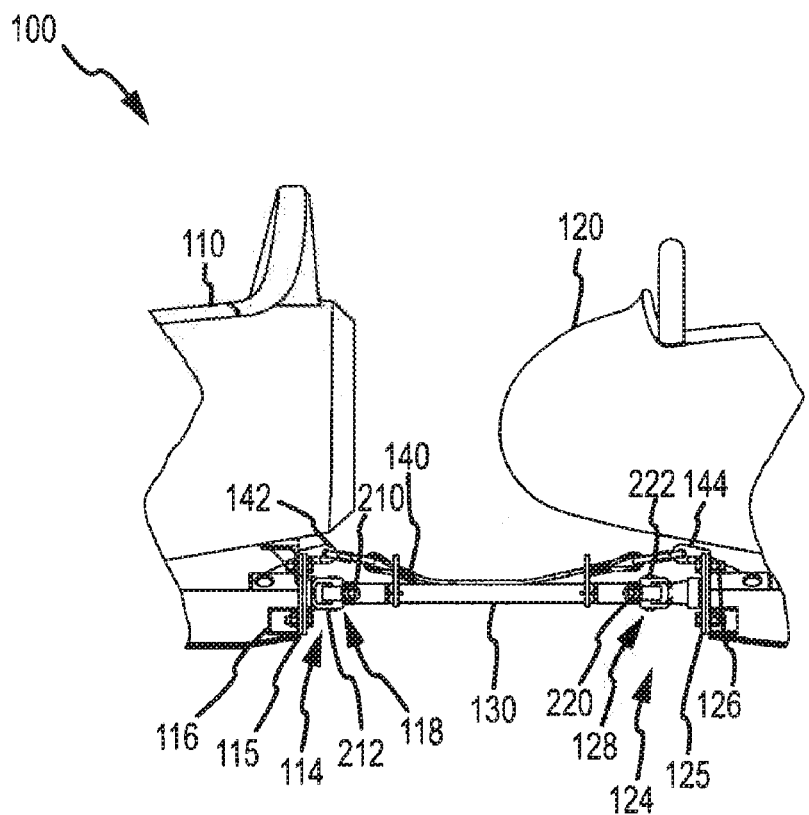
FIG. 2 illustrates a side view similar to that of FIG. 1 showing more detail of the park ride illustrating the towing or connection assembly between two vehicles (e.g., a towing vehicle and a towed vehicle) with the towing assembly restraint removed or not yet installed.

FIG. 2 illustrates in more detail the ride 100 showing the connection between the two vehicles 110, 120 prior to installation of the towing assembly restraint 150 over the tow bar 130 and connection assemblies 114, 124. As shown, the coupling assemblies 118, 128 includes couplers with two axes of movement as the tow bar 130 can move up-and-down (pitch) with movement about pins 210, 220 and can move side-to-side (yaw) with movement about pins 212, 222. Hence, it is important for the towing assembly restraint 150 to be formed with a non-rigid or flexible body 152 that allows the tow bar 130 to continue to move in these two directions during operation of the ride 100. This is achieved by forming the body out of two or more fibers, strands, ribbons, or the like that are provided in a cross weave pattern rather than a solid tube. With this flexible nature, the restraint 150 as shown in FIG. 1 can extend over and encapsulate the pins 210, 212, 220, 222 and the other portions of the coupling assemblies 118, 128 such that if these components or parts fail or portions fracture off they are captured within the inner walls of the woven body 152. Further, the components are generally aligned along a single axis such that if the towing vehicle 110 brakes the failed components of the towing assembly will generally contact each other providing a load path to resist compressive forces such that the towed vehicle 120 will not collide with the back end of the towing vehicle 110.

Figure 3:
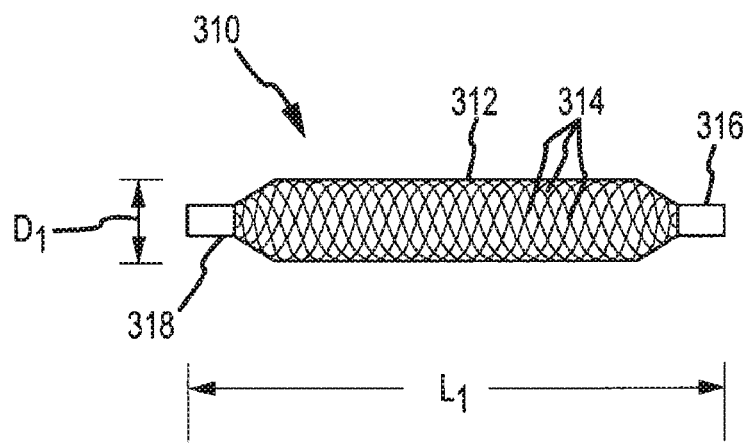
FIG. 3 shows an embodiment of towing assembly restraint in a relaxed (or at rest) or non-tensioned configuration as it may appear prior to installation on a park ride or on a vehicle such as a semi or other truck or another automobile used to pull a trailer.

One embodiment of a towing assembly restraint 310 is shown in FIG. 3 (as may be used to provide restraint 150 of FIG. 1). The restraint 310 includes an elongate, hollow or cylindrical body 312. The body 312 is formed from two or more strands, fibers, or ribbons 314 that are woven such that at least some of the strands, fibers, or ribbons 314 are provided in a crosshatch pattern and/or provide a bi-axial braid. The specific pattern selected for the body 312 may vary to practice the invention and may be varied based on the particular materials used for the strands, fibers, or ribbons 314 and based on the desired physical characteristics of the restraint 310 (e.g., tensile strength required, amount of stretch prior to being "sprung" to minimum diameter, and the like). The body 312 extends between ends 316, 318 which may simply be an extension of the body 312 or the fibers 314 may be sealed, connected, fused, or the like to form the ends 316, 318 so as to limit risks of fraying or unraveling of the pattern of the body 312 (or to facilitate insertion in and mating with a coupling or clamp connection for the ends (see, for example, FIG. 6)).

Figure 4:
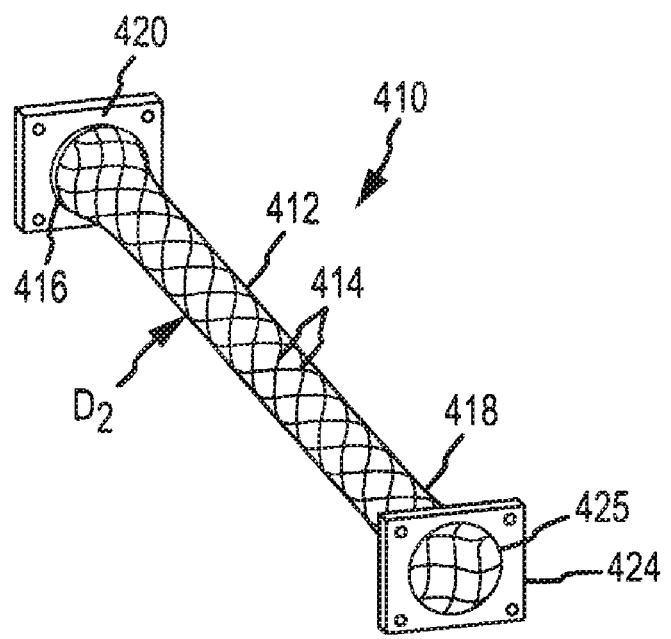
FIGS. 4 and 5 show an embodiment of a towing assembly restraint with an isometric and side view, respectively, in the tensioned or elongated configuration as it may appear when installed illustrating representative mounting or coupling plates useful for binding the fibers or strands of the woven body at the ends and for mounting the ends to a vehicle.
Figure 5:
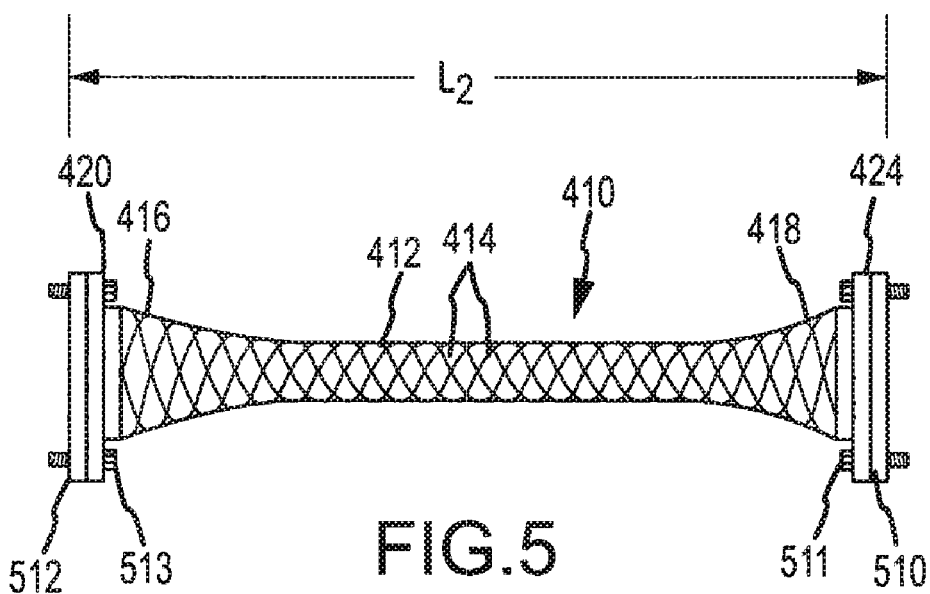

The restraint 310 may be manufactured generally similarly to a common Chinese finger trap, but, instead of utilizing ribbons of bamboo, the strands, fibers, or ribbons are formed of materials that have much higher strength. For example, ribbons may be formed for a plurality of wire rope or of composite fibers (such as fiberglass, Kevlar, carbon fiber, or the like, and these "ribbons" or groups of strands or fibers may be woven in a bi-axial braid (e.g., in a crosshatch or crisscross pattern). The restraint 310 is shown at rest or under no compressive or tensile forces. At rest, the restraint 310 has a first length, $L_1$, and a first body diameter, $D_1$. When tensile forces are applied along the longitudinal axis (as is the case when the restraint 310 is installed and upon failure of a towing assembly), the body 312 is elongated to a second length, $L_2$, and concurrently contracts to a second, smaller diameter, $D_2$ (as shown in FIGS. 1, 4, and 5).

When installed as shown with restraint 150, this results in any components within the internal chamber defined by body 312 being captured or trapped by the fabric 314. The tightening is a reaction of the fibers placed in some embodiments in a biaxial braid. By pulling or trying to stretch the body 312, the braided fibers 314 are trying to lengthen, but the material to increase the length from the first length, $L_1$, to the second length, $L_2$, is taken from material formerly used to keep the body 312 at the first wider diameter, $D_1$. Total surface area of the body 312, of course, remains constant and, thus, the more tension or force that is applied to pull or elongate the more the diameter of the body shrinks and the body's inner surfaces tighten upon any enclosed components such as parts of a towing assembly. To remove the restraint from a towing assembly, the tensile force is simply released and/or compressive forces are applied to increase the diameter of the body to or towards the at rest diameter, $D_1$.

The amount of elongation of the body 312 and of contraction of its diameter may vary to practice the invention, with some embodiments providing for elongation of up to 50 percent or more with a coinciding contraction in diameter of up to 75 percent or more but more typically a contraction of about 20 to 50 percent is experienced (e.g., $D_2$ is about 80 to 50 percent (or even down to 25 percent or less) of $D_1$). Also, it should be understood that the diameter of the body 312 will shrink further upon failure from the installation diameter, $D_2$, to some minimum diameter (not shown) at which point the restraint 310 acts as a tensile load member to tow the trail vehicle 120. In other words, the restraint 310 in some embodiments is configured to have a tensile strength great enough to allow the towing assembly including a tow bar or other components to fail and the restraint 310 can act, at least temporally to pull the towed vehicle 120. In these embodiments, the restraint 310 may have strength when elongated to its "minimum" diameter such that the restraint can tow or pull several thousand pounds and often up to 20 to 30 thousand pounds or more.

In one embodiment, the body 312 is formed with a biaxial braid, although other techniques may be used, and the strips of fiber, wire, or the like are arranged in "ribbons" such as groups of fibers, wire, strands, or the like that are grouped together with a width of 0.125 to 1 inch or more. In one embodiment, four lengths of ribbon are cut, the ribbons are paired, and the ends of the ribbons in the pairs are attached (temporarily or more permanently). The attached ends are placed on a rod, tube, or other cylindrical object to facilitate braiding. Braiding is then initiated to get a lattice effect or crosshatch pattern about the rod. This braiding is continued for the length of the ribbon pairs, and then, the rod is removed with the ribbons arranged or woven into a biaxial braid. Of course, many other fabrication techniques may be used to form the body 312 of the restraint with the significant feature being that at least some of the strands, fibers, or other fabric 314 of the body 312 are woven or arranged in a crosshatch pattern that creates the desired functionality (e.g., a tubular body 312 that extends in length ($L_1$ to $L_2$) and concurrently shrinks in diameter ($D_1$ to $D_2$) similar to a Chinese finger trap). Generally, the bodies of the restraints may be considered to be made of a spiral wound weave of fibers, strands, or the like considered alone or as groups (e.g., ribbons of particular widths). Such a crosshatch pattern may be labeled as a multi-axial (e.g., two (i.e. "bi") or more axes) braid of two or more of the fibers or ribbons of such fibers in which the fibers or ribbons are wound at a transverse angle relative to the longitudinal axis of the body to create a lattice or crosshatch pattern.

FIGS. 4 and 5 illustrate a towing assembly restraint 410 such as may be used for the restraint 150 in ride 100 of FIG. 1 (and manufactured/configured as described above for restraint 310). As shown, the restraint 410 includes a tubular body 412 extending between two ends 416, 418. The body 412 is shown as it may appear upon installation at a second, smaller diameter, D2, and a second, elongated length, L2, such as desired to pre-capture or restrain towing assembly parts (e.g., "pre" as in before failure). The body 412 is formed with braided fibers (or fibers arranged as groups or sets in ribbons that are then braided), with the braid pattern being a biaxial braid or other crosshatch pattern useful for achieving the functions described herein. The restraint 410 includes end or retaining plates 420, 424 that are attached to the ends 416, 418 of the body 412 (e.g., the body fibers or braided webbing 414 are attached to the plates 420, 424 at or near their ends to rigidly retain them such as with a web retaining ring). The plate 424 is shown to include an opening 425 for receiving the towing assembly (e.g., tow bar and coupling components) into the interior chamber of the body 412 as defined by body fibers 414. FIG. 5 illustrates further the restraint 410 with the end plates 420, 424 attached to mounting plates 510, 512, with fasteners 511, 513. In applications where roll is useful, the plates 510, 512 or the coupling between the plates 420, 424 with the fibers 414 is achieved such that the body 412 can rotate at least at the ends 416, 418 (e.g., about the longitudinal axis of the body 412). In other cases, roll is not required such as in typical commercial and recreational vehicles where a trailer is pulled behind a towing vehicle, and the plates 420, 424 may be rigidly attached to the plates 510, 512 (or to another structure on the vehicle such as a bumper, hitch accessory plate, or the like).

Figure 6:
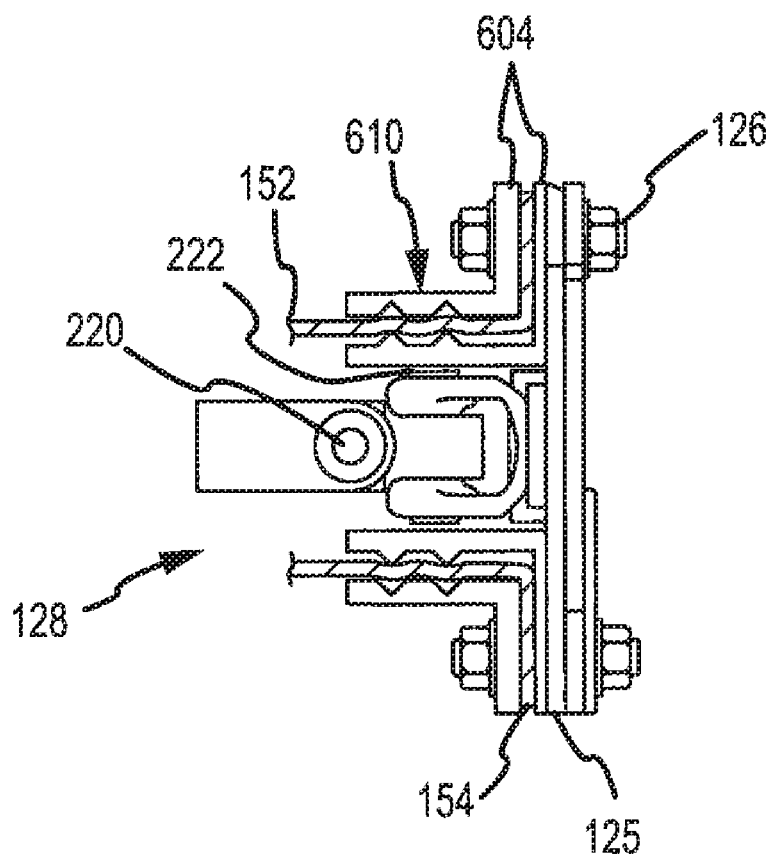
FIG. 6 illustrates a detailed view of one embodiment of a clamp connection taken from FIG. 1 that may be used to connect the end of the towing assembly restraint to a vehicle and to bind the fibers or strands of the woven body.

FIG. 6 provides a detailed illustration of the connection between the towing assembly restraint 150 and the undercarriage 122 of the ride 100 of FIG. 1. As shown, the body 152 of the restraint 150 is attached to mounting plate 125 with restraint end/clamp 604 via fasteners 126. Roll may be desired in the ride 100, and, if so, the plate 125 would preferably be attached to the undercarriage 122 such that it can rotate, which allows the tow bar 130 and restraint body 152 to also rotate about their longitudinal axes. The clamps 604 are shown to include tongue and groove (or ridge and recess) members 610 for engaging the walls of the body 152 (e.g., for biting into the woven fibers of the body 152 to firmly hold the body in place). FIG. 6 also illustrates clearly that the body 152 extends over pins 220, 222 of coupling assembly 128 such that if these components were to fail and break apart the broken pieces are trapped within the body 152 by its inner walls or fibers of the braid pattern.

Figure 7:
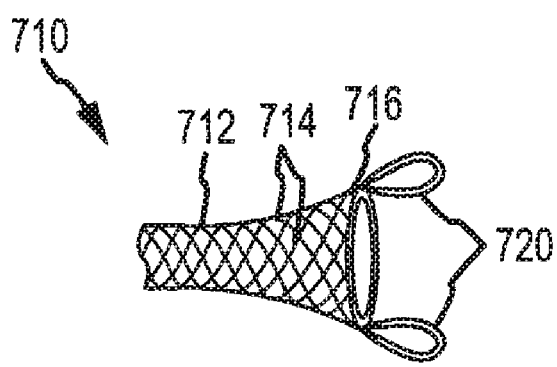
FIG. 7 illustrates another end embodiment for a towing assembly restraint in which the end fibers connected or a seam provided to limit unraveling/fraying and also providing loops for connection of the assembly to a vehicle in a relatively simple fashion (e.g., as may be useful for commercial and recreational vehicles in less demanding environments)

FIG. 1 illustrates use of a towing assembly restraint with an amusement park ride, but the restraint concepts of the invention are readily applicable to many other applications such as for use with commercial vehicles such as trucks including semi-trucks pulling trailers and such as for use for individuals using their vehicles to pull trailers (e.g., RVs pulling trailers and other vehicles pulling trailers such as boat trailers and the like). Many of these vehicles may utilize the restraints as shown in FIGS. 1-6, with a connection made to suit the particular towing assembly such as for a ball hitch for use with a tow bar or other arrangement. In some of these cases, the attachment to the vehicle can be achieved more readily without fasteners. For example, FIG. 7 illustrates a partial view of a towing assembly restraint 710 of the invention with a body 712 formed of fibers or ribbons 714. At end 716 the fibers 714 are enclosed or sealed to minimize fraying or loss of the braid pattern. Attachment loops 720 are provided such that the restraint 710 can be attached to the vehicle with various connection methods such as placing the loops over the ball or through hooks or connecting loops provided on the vehicle (such as part of the bumper or factory provided towing package) or as an add on accessory. The attachment loops 720 in some embodiments are formed from a subset of the fibers or ribbons or webbing that is allowed to extend outward from the ends of the body 712.

Figure 8:
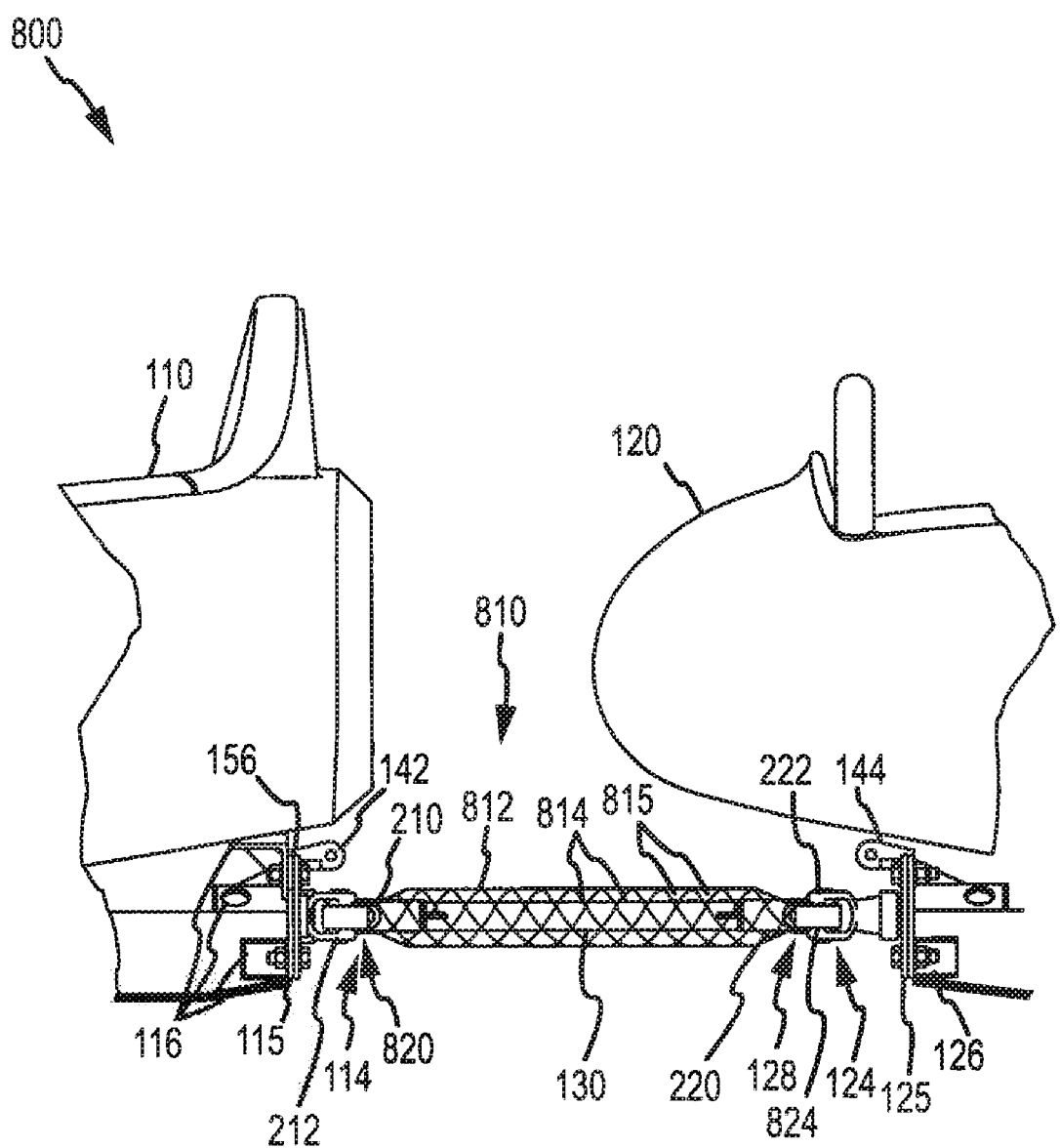
FIG. 8 is a partial side view of an amusement park ride similar to FIGS. 1 and 2 that shows another connection or coupling embodiment for the ends of the towing restraint assembly and illustrating configurations in which use of a woven body allows visual inspection of captured/restrained components such as the tow bar in this case.

FIG. 8 illustrates an amusement park ride 800 with many of the components as shown in FIG. 1. The ride 800 includes another embodiment of a towing assembly restraint 810 for encapsulating the towing assembly. As shown, the restraint 810 includes a tubular body 812 of woven fabric (or ribbons) 814. The body 812 includes spaces or gaps 815 between or among the woven fibers or strands 814, and this can be achieved by selecting a "looser" weave for the body 812 or a configuration in which the restraint 810 is nearer to its at rest length, L1, and diameter, D1, when installed or during normal operations. In this arrangement, the body 812 and use of woven fibers 814 allows for visual inspection of the encapsulated components such as tow bar 130 and pins 210, 212, and the like. Such visual inspection without removal of the restraint 810 may be highly desirable in applications such as amusement parks where inspection is required frequently (such as once a day). The restraint 810 differs in its attachment to the vehicles 110, 120 when compared with restraint 150 as it is bound at its ends with couplings 820, 824 that place the ends of the body 812 over the pins 210, 220 but not pins 212, 222. Hence, the restraint 810 encapsulates a substantial portion of the towing assembly including tow bar 130 but not the entire towing assembly, and such "partial capture" may be desirable in some embodiments such as where failure is more likely to occur in particular components (that are thus captured) or failure of certain parts is more dangerous (such as a dangling or dropping tow bar).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the embodiments shown in the FIG.s utilized bodies with a wall of a single thickness or weave of the braided material or fibers. In other embodiments, the restraints may have more than one wall or a wall with multiple layers of braided material, e.g., to provide enhanced tensile load bearing capacity. Also, the restraints described herein may be used to safely restrain or capture items other than towing assemblies, and these other uses are considered within the breadth of the above description and following claims. For example, the restraints may be used to enclose rotating shafts such as those found on vehicles including race cars and as used in manufacturing, power facilities, rotating universal joints, and the like. The restraint installed over the rotating shaft will lessen the risk of the rotating shaft dropping down upon a failure that could result in serious damage or injury (such as if a drive shaft drops and causes the vehicle to overturn or crash).

We claim:

1. A safety restraint for use with a towing assembly, the towing assembly attached at a first end to a towing vehicle and at a second end to a towed vehicle with first and second connection assemblies on the towing and towed vehicles, respectively, comprising:
   an elongate, hollow body for receiving the towing assembly comprising at least two fibers combined in a multi-axis braid pattern that extends from a first end to a second end of the body; and
   coupling mechanisms attached to each of the ends of the body, the coupling mechanisms comprising mounting plates and adapted for attaching the first end of the body to the towing vehicle and the second end to the towed vehicle,
   wherein, after attachment of the safety restraint to the vehicles, the fibers of the braid pattern at least partially encapsulate the towing assembly including extending over and encapsulating at least a portion of each of the first and second connection assemblies,
   wherein the towing assembly comprises a tow bar coupled at the first end and at the second end for pitch and yaw movements and wherein the braid pattern of the hollow body has adequate flexibility to move with the tow bar during the pitch and yaw movements,
   wherein the body has a tensile yield strength sufficient to enable the towing vehicle to tow the towed vehicle when the towing assembly fails, and
   wherein, upon failure of an encapsulated portion of the towing assembly, the hollow body retains the encapsulated portion including the encapsulated portion of each of the first and second connection assemblies within the hollow body.

2. The safety restraint of claim 1, wherein the hollow body has a first length and a first diameter prior to being attached to the towing and towed vehicles and a second length greater than the first length and a second diameter less than the first diameter after being stretched to attach to the towing vehicle and the towed vehicle.

3. The safety restraint of claim 1, wherein the fibers comprise a metal fiber or a composite material fiber.

4. The safety restraint of claim 3, wherein the body comprises a first set of fibers arranged into a first ribbon and a second set of fibers arranged in a second ribbon, the first ribbon and the second ribbon woven into a biaxial braid between the first and second ends.

5. The safety restraint of claim 1, wherein the coupling mechanisms are rotatably attached to the towing vehicle and to the towed vehicle, whereby the hollow body rotates about a longitudinal axis of the hollow body with roll movement of the tow bar.

6. A safety apparatus for use in towing, comprising:
   a towing assembly for connecting a towed vehicle to a towing vehicle; and
   a restraint comprising a hollow, cylindrical body at least partially encapsulating the towing assembly, the restraint body being extendable from a first length to a second, longer length and having a first diameter at the first length and a second, smaller diameter at the second length, wherein the restraint body has a tensile yield strength sufficient to enable the towing vehicle to tow the towed vehicle after failure of the towing assembly and wherein the restraint body is extended to the second length when the restraint is attached to the towed and towing vehicles and a friction-based gripping reaction is achieved between the towing assembly and the restraint body when the body has the second diameter.

7. The apparatus of claim 6, wherein the restraint body comprises a wall formed of two or more fibers woven into a biaxial braid.

8. The apparatus of claim 7, wherein the fibers comprise a metallic or composite material.

9. The apparatus of claim 7, wherein the wall comprises a first set of the fibers arranged into a first ribbon and a second set of the fibers arranged into a second ribbon and wherein the first and second ribbons are positioned in the biaxial braid.

10. The apparatus of claim 6, wherein the towing assembly comprises a tow bar attached at first and second ends to the vehicles for pitch and yaw movements and wherein the restraint body is rigidly attached to the vehicles and has flexibility to move with the tow bar during the pitch and yaw movements.

11. The apparatus of claim 10, wherein the tow bar is further mounted to the vehicles at the first and second ends for roll and the restraint body is rotatably attached to the vehicles to rotate about a longitudinal axis.

12. The apparatus of claim 6, wherein the second diameter is less than 80 percent of the first diameter.

13. The apparatus of claim 6, wherein the towing assembly comprises a pair of coupling assemblies connecting ends of the towing assembly to the towed and towing vehicles and wherein the restraint is attached at a first end to the towing vehicle and at a second end to the towed vehicle such that the restraint body at least partially encapsulates each of the coupling assemblies.

14. The apparatus of claim 6, wherein the tensile yield strength is greater than 1000 pounds.

15. The apparatus of claim 14, wherein the tensile yield strength is at least 20,000 pounds.

16. The apparatus of claim 6, wherein the towing assembly comprises a tow bar with an outer diameter and wherein the second diameter of the restraint body is approximately equal to the outer diameter of the tow bar.

17. The apparatus of claim 6, wherein the restraint body restrains the towing assembly including broken components of the towing assembly in an aligned manner to provide a compressive load bearing member, whereby the safety apparatus continues to provide resistance to compressive forces after the failure of the towing assembly.

18. An apparatus for use as a safety restraint for towing assemblies, rotating shafts, and structures, comprising:
   a cylindrical, hollow body with a wall formed of a plurality of fibers woven in a crosshatch pattern, whereby the hollow body has a first diameter and a first length when at rest and a second diameter less than the first diameter and a second length greater than the first length under a tensile load; and
   connecting members at the ends of the wall for connecting the apparatus to a support structure when one of a towing assembly, a rotatable shaft, or other structure is received within the hollow body, wherein the connecting members are configured to allow the body to rotate at the ends of the wall about a longitudinal axis of the body and wherein the connecting members comprise mounting plates.

19. The apparatus of claim 18, wherein the support structure comprises coupling mechanisms on a first and a second vehicle and the second diameter is at less than 80 percent of the first diameter.

20. The apparatus of claim 18, wherein the plurality of fibers are provided in two or more ribbons and the ribbons are provided in a multi-axial braid extending between the ends of the wall.

21. The apparatus of claim 18, wherein the first diameter is greater than an outside diameter of the one of the towing assembly, rotatable shaft, or other structure received in the body and the second diameter is approximately equal to the outside diameter.

22. The apparatus of claim 18, wherein the wall comprises a plurality of gaps between the fibers, whereby lines of sight are provide to an interior of the body to enable visual inspection of received objects within the apparatus.

* * * * *